(12) United States Patent
Agarwala et al.

(10) Patent No.: US 6,954,468 B1
(45) Date of Patent: Oct. 11, 2005

(54) WRITE ALLOCATION COUNTER FOR TRANSFER CONTROLLER WITH HUB AND PORTS

(75) Inventors: Sanjive Agarwala, Richardson, TX (US); Iain Robertson, Bedfordshire (GB); David A. Comisky, Plano, TX (US); Charles L. Fuoco, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 949 days.

(21) Appl. No.: 09/713,423

(22) Filed: Nov. 15, 2000

Related U.S. Application Data

(60) Provisional application No. 60/169,415, filed on Dec. 7, 1999.

(51) Int. Cl.[7] ................................................. H04J 3/16
(52) U.S. Cl. ........................................................ 370/468
(58) Field of Search ............................... 370/371, 374, 370/378, 381, 382, 383, 465, 468; 710/22, 710/23, 24, 25

(56) References Cited

U.S. PATENT DOCUMENTS 5,014,265 A * 5/1991 Hahne et al. ............... 370/236
5,390,299 A * 2/1995 Rege et al. .................. 709/234
6,574,683 B1 * 6/2003 Comisky et al. .............. 710/23

OTHER PUBLICATIONS

Texas Instruments, SPRU190C, TMS320C6000 Peripherals Reference Guide, Chapter 6, pp. 1-41, Apr. 1999.*
Comisky et al, A Scalable High-Performance DMA Architecture for DSP Applications, IEEE, pp. 414-419, Sep. 2000.*

* cited by examiner

*Primary Examiner*—Frank Duong
(74) *Attorney, Agent, or Firm*—Robert D. Marshall, Jr.; W. James Brady, III; Frederick J. Telecky, Jr.

(57) ABSTRACT

The transfer controller with hub and ports uses a write allocation counter and algorithm to control data reads from a source port. The write allocation count is the amount of data that can be consumed immediately by the write reservation station of a slow destination port and the channel data router buffers. This is used to throttle fast source port read operations to whole read bursts until space to adsorb the read data is available. This ensures that the source port response queue is not blocked with data that cannot be consumed by the channel data router and the slow destination port. This condition would otherwise block a fast source port from providing data to the other destination ports.

14 Claims, 5 Drawing Sheets

WRITE ALLOCATION COUNTER FOR TRANSFER CONTROLLER WITH HUB AND PORTS

This application claims priority under 35 USC §119(e)(1) of Provisional Application No. 60/169,415, filed Dec. 7, 1999.

TECHNICAL FIELD OF THE INVENTION

The technical field of this invention is digital signal processing and more particularly control of data transfers within a digital signal processing system.

BACKGROUND OF THE INVENTION

Digital signal processing (DSP) differs significantly from general purpose processing performed by micro-controllers and microprocessors. One key difference is the strict requirement for real time data processing. For example, in a modem application, it is absolutely required that every sample be processed. Even losing a single data point might cause a digital signal processor application to fail. While processing data samples may still take on the model of tasking and block processing common to general purpose processing, the actual data movement within a digital signal processor system must adhere to the strict real-time requirements of the system.

As a consequence, digital signal processor systems are highly reliant on an integrated and efficient direct memory access (DMA) engine. The direct memory access controller is responsible for processing transfer requests from peripherals and the digital signal processor itself in real time. All data movement by the direct memory access must be capable of occurring without central processing unit (CPU) intervention in order to meet the real time requirements of the system. That is, because the CPU may operate in a software tasking model where scheduling of a task is not as tightly controlled as the data streams the tasks operate on require, the direct memory access engine must sustain the burden of meeting all real time data stream requirements in the system.

The early direct memory access has evolved into several successive versions of centralized transfer controllers and more recently into the transfer controller with hub and ports architecture. The transfer controller with hub and ports architecture is described in U.K. Patent Application No. 9909196.9 filed Apr. 10, 1999 entitled "TRANSFER CONTROLLER WITH HUB AND PORTS ARCHITECTURE" now U.S. Pat. No. 6,496,740.

A first transfer controller module was developed for the TMS330C80 digital signal processor from Texas Instruments. The transfer controller consolidated the direct memory access function of a conventional controller along with the address generation logic required for servicing cache and long distance data transfer, also called direct external access, from four digital signal processors and a single RISC (reduced instruction set computer) processor.

The transfer controller architecture of the TMS330C80 is fundamentally different from a direct memory access in that only a single set of address generation and parameter registers is required. Prior direct memory access units required multiple sets for multiple channels. The single set of registers, however, can be utilized by all direct memory access requesters. Direct memory access requests are posted to the transfer controller via set of encoded inputs at the periphery of the device. Additionally, each of the digital signal processors can submit requests to the transfer controller. The external encoded inputs are called "externally initiated packet transfers" (XPTs). The digital signal processor initiated transfers are referred to as "packet transfers" (PTs). The RISC processor could also submit packet transfer requests to the transfer controller.

The transfer controller with hub and ports introduced several new ideas concepts. The first was uniform pipelining. New digital signal processor devices containing a transfer controller with hub and ports architecture have multiple external ports, all of which look identical to the hub. Thus peripherals and memory may be freely interchanged without affecting the hub. The second new idea is the concept of concurrent execution of transfers. That is, up to N transfers may occur in parallel on the multiple ports of the device, where N is the number of channels in the transfer controller with hub and ports core. Each channel in the transfer controller with hub and ports core is functionally just a set of registers. This set of registers tracks the current source and destination addresses, the word counts and other parameters for the transfer. Each channel is identical, and thus the number of channels supported by the transfer controller with hub and ports is highly scalable.

Finally the transfer controller with hub and ports includes a mechanism for queuing transfers up in a dedicated queue memory. The TMS320C80 transfer controller permitted only was one transfer outstanding per processor at a time. Through the queue memory provided by the transfer controller with hub and ports, processors may issue numerous transfer requests up to the queue memory size before stalling the digital signal processor.

SUMMARY OF THE INVENTION

The transfer controller with hub and ports has undergone significant refinements in implementation that followed the original description in U.K. Patent Application No. 9909196.9 filed Apr. 10, 1999 entitled "TRANSFER CONTROLLER WITH HUB AND PORTS ARCHITECTURE" now U.S. Pat. No. 6,496,740. One such refinement is the use of a write allocation counter in the source pipeline. The algorithm upon which this write allocation counter operates is also key to the invention.

The write allocation counter is used to throttle the fast source port read operations based on the amount of data that can be consumed immediately by the slow destination port write reservation station and the channel data router buffers. This ensures that source port response queue is not blocked with data that cannot be consumed by the requesting channel data router and its slow destination port and thereby blocking out source port from providing data to the other channel destination ports.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
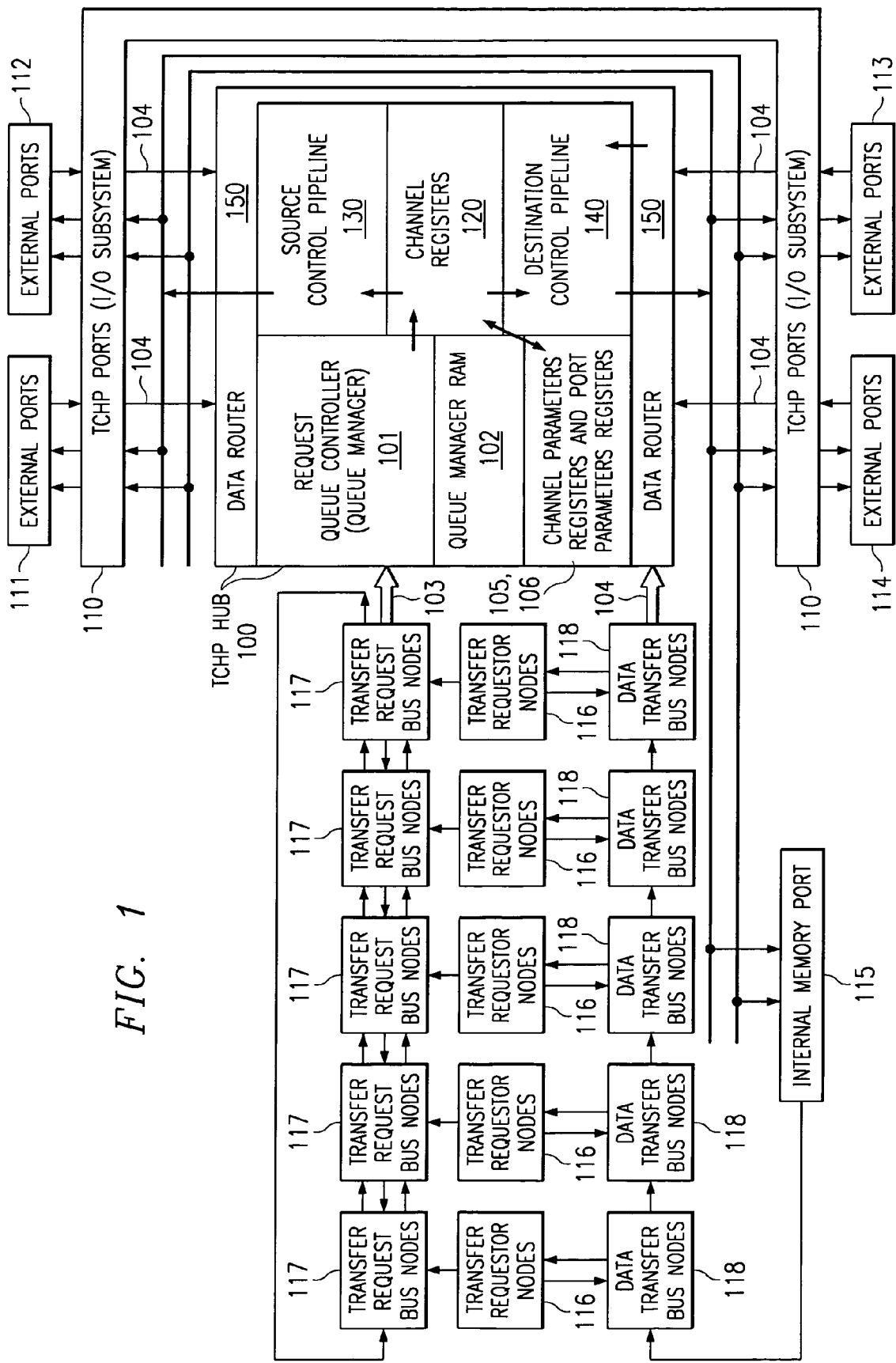
FIG. 1 illustrates in a functional block diagram the basic principal features of the transfer controller with hub and ports architecture and related functions.

The transfer controller with hub and ports transfer controller with hub and ports architecture is optimized for efficient passage of data throughout a digital signal processor chip. FIG. 1 illustrates a block diagram of the principal features of the transfer controller with hub and ports. It consists of a system of a single hub 100 and multiple ports 111 through 115.

The transfer controller with hub and ports functions in conjunction with a transfer request bus having a set of nodes 117, which bring in transfer request packets at input 103. These transfer request bus nodes individually receive transfer requests packets from transfer requesters 116 which are processor-memory nodes or other on-chip functions which send and receive data.

Secondly, the transfer controller uses an additional bus, the data transfer bus having a set of nodes 118, to read or write the actual data at the requestor nodes 116. The data transfer bus carries commands, write data and read data from a special internal memory port 115 and returns read data to the transfer controller hub via the data router 150 at inputs 104.

The transfer controller has, at its front-end portion, a request queue manager 101 receiving transfer requests in the form of transfer request packets at its input 103. Request queue manager 101 prioritizes, stores and dispatches these as required.

Request queue manager 101 connects within the transfer controller hub unit 100 to the channel request registers 120 which receive the data transfer request packets and process them. In this process, request queue manager 101 first prioritizes the transfer request packets and assigns them to one of the N channel request registers 120. Each of the N channel request registers 120 represents a priority level.

If there is no channel available for direct processing of the transfer request packet, it is stored in the queue manager memory 102. Queue manager memory 102 is preferably a random access memory (RAM). The transfer request packet is then assigned at a later time when a channel becomes available. The channel registers interface with the source 130 and destination 140 control pipelines which effectively are address calculation units for source (read) and destination (write) operations.

Outputs from these pipelines are broadcast to M ports through the transfer controller ports I/O subsystem 110. I/O subsystem 110 includes a set of hub interface units, which drive the M possible external ports units. Four such external ports are shown in FIG. 1 as external ports 111 through 114. The external ports units (also referred to as application units) are clocked either at the main processor clock frequency or at a different external device clock frequency. The external device clock frequency may be lower than or higher than the main processor clock frequency. If a port operates at its own frequency, synchronization to the core clock is required.

As an example of read-write operations at the ports, consider a read from external port node 112 followed by a write to external port node 114. First the source pipeline addresses port 112 for a read. The data is returned to the transfer controller hub through the data router 150. On a later cycle the destination control pipeline addresses port 114 and writes the data at port 114. External ports as described here do not initiate transfer requests but merely participate in reads and writes requested elsewhere on the chip. Read and write operations involving the processor-memory (transfer requesters) nodes 116 are initiated as transfer request packets on the transfer request bus 117. The queue manager 101 processes these as described above. On a later cycle a source pipeline output (read command/address) is generated which is passed at the internal memory port to the data transfer bus 118 in the form of a read. This command proceeds from one node to the next in pipeline fashion on the data transfer bus. When the processor node addressed is reached, the read request causes the processor-memory node to place the read data on the bus for return to the data router 150. On a later cycle, a destination pipeline output passes the corresponding write command and data to the internal memory port and on to the data transfer bus for writing at the addressed processor node.

The channel parameter registers 105 and port parameters registers 106 hold all the necessary parametric data as well as status information for the transfer controller hub pipelines to process the given transfer. Both pipelines share some of the stored information. Other portions relate specifically to one pipeline or the other.

Figure 2:
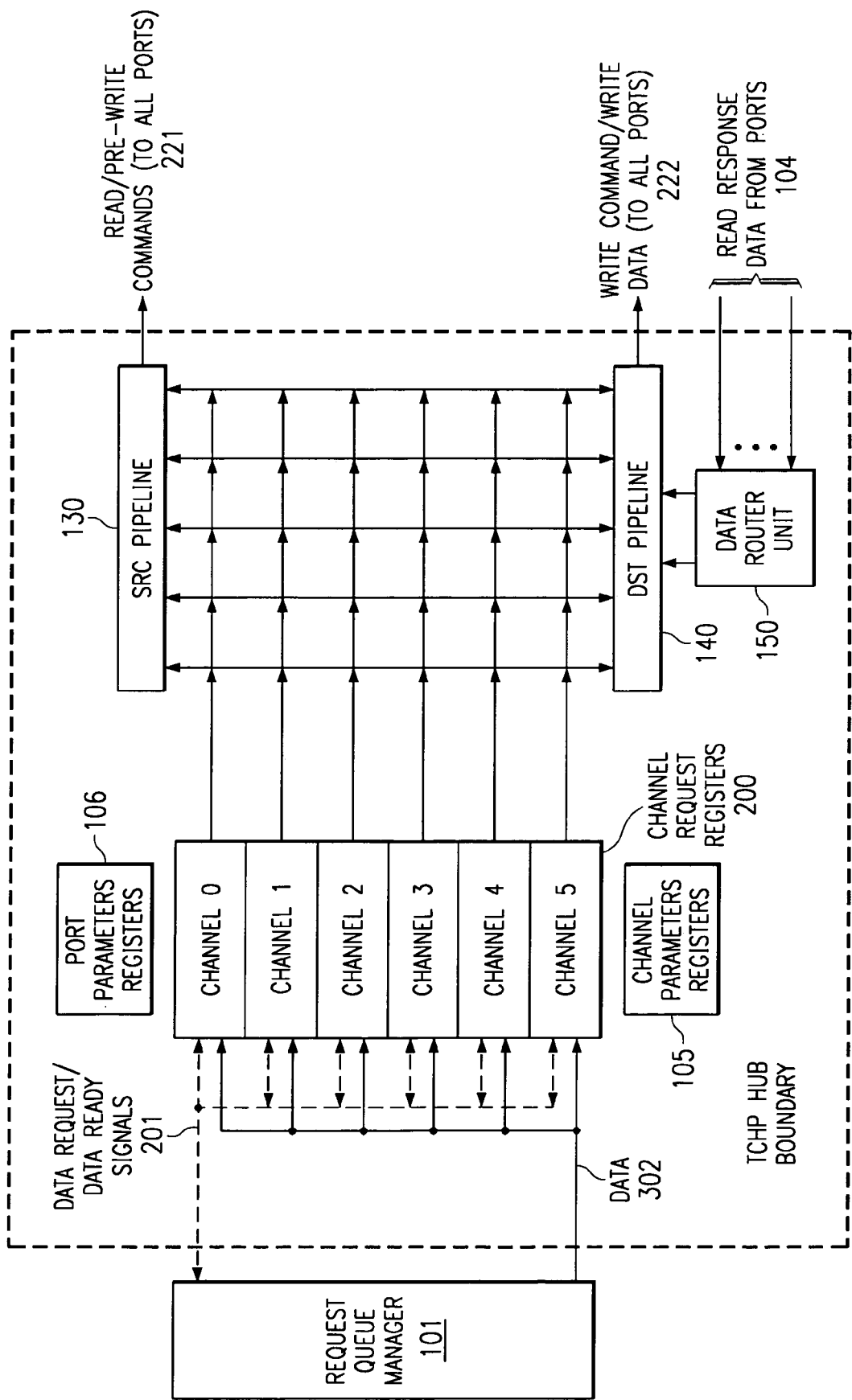
FIG. 2 illustrates the queue manager interface to the transfer controller hub unit.

FIG. 2 illustrates the interface of request queue manager 101 to the transfer controller hub unit boundary and particularly the request queue manager communications with the channel request registers 200, channel parameter registers 105 and port parameters registers 106. Channel parameters registers 105 and port parameters registers 106 store critical data regarding for example, types of transfers, mode information, status, and much other information critical to the transfer process.

Channel request registers 200 pass information used in the source control pipeline 130 for generation of the read/pre-write commands 221. Similarly, channel request registers 200 pass information used in the destination control pipeline 140 for the generation of write command/write data words 222. Read response data 104 from the ports is returned to the destination pipeline via the data router 150.

Figure 3:
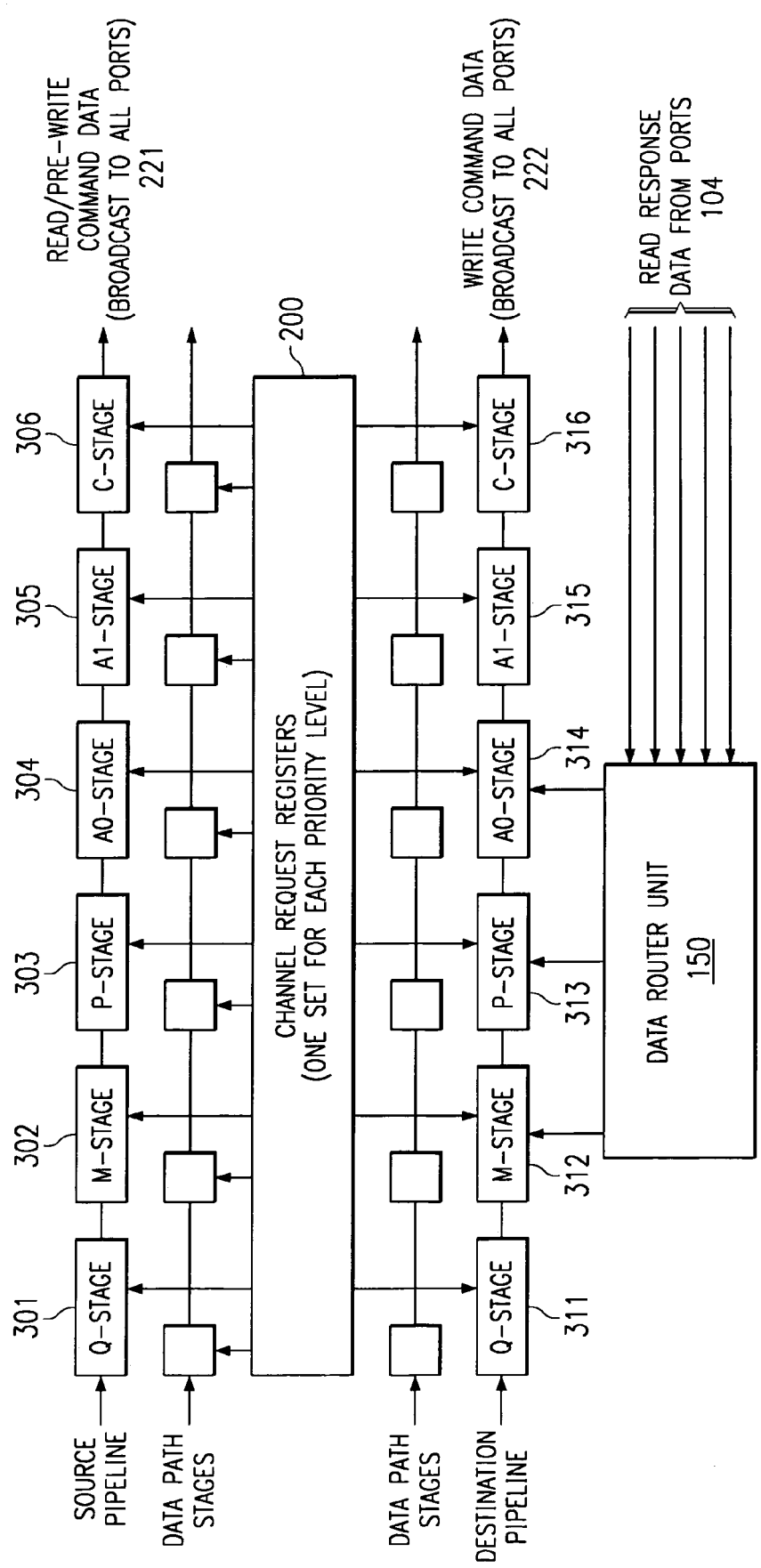
FIG. 3 illustrates the transfer controller source and destination operational pipelines.

FIG. 3 illustrates the possible pipelines in a transfer controller implementation. Table 1 shows the particular tasks performed during the pipeline stages in the preferred embodiment. In specific implementations, one or more stages may be combined but the tasks for the individual pipeline stages are essentially as shown in Table 1.

TABLE 1

| Pipeline Stage | Function |
| --- | --- |
| Q | Interrogates state of queues within ports |
| M | Maps port ready signals to channels |
| P | Prioritize highest priority channel with ready ports |
| A0 | First half of address update cycle |
| A1 | Second half of address update cycle |
| C | Issues command to ports |

The channel request registers 200 pass information used in the source pipeline stages 301 to 306 for generation of the read/pre-write commands 221. Similarly, the channel request registers 200 pass information used in the destination pipeline stages 311 to 315 for the generation of write command/write data words 222. Read response data 104 from the ports is returned to the destination pipeline via the data router 150.

Source Pipeline

The functions of the first three individual stages of the source pipeline (Q, M and P stages) may be combined into just two stages, the M-stage and the P-stage. The P-stage is of the most significance in the present invention. The source pipeline functions perform all the source reads and destination reservation station pre-writes for a write driven processing transfer. Write driven processing is performed when the read port is relatively slow as compared to the destination port. The pre-allocated write space in the ports is divided into multiples of write burst size and each such entry is termed as a reservation station. A pre-write reserves a reservation station entry in a port for the channel initiating the request.

Figure 4:
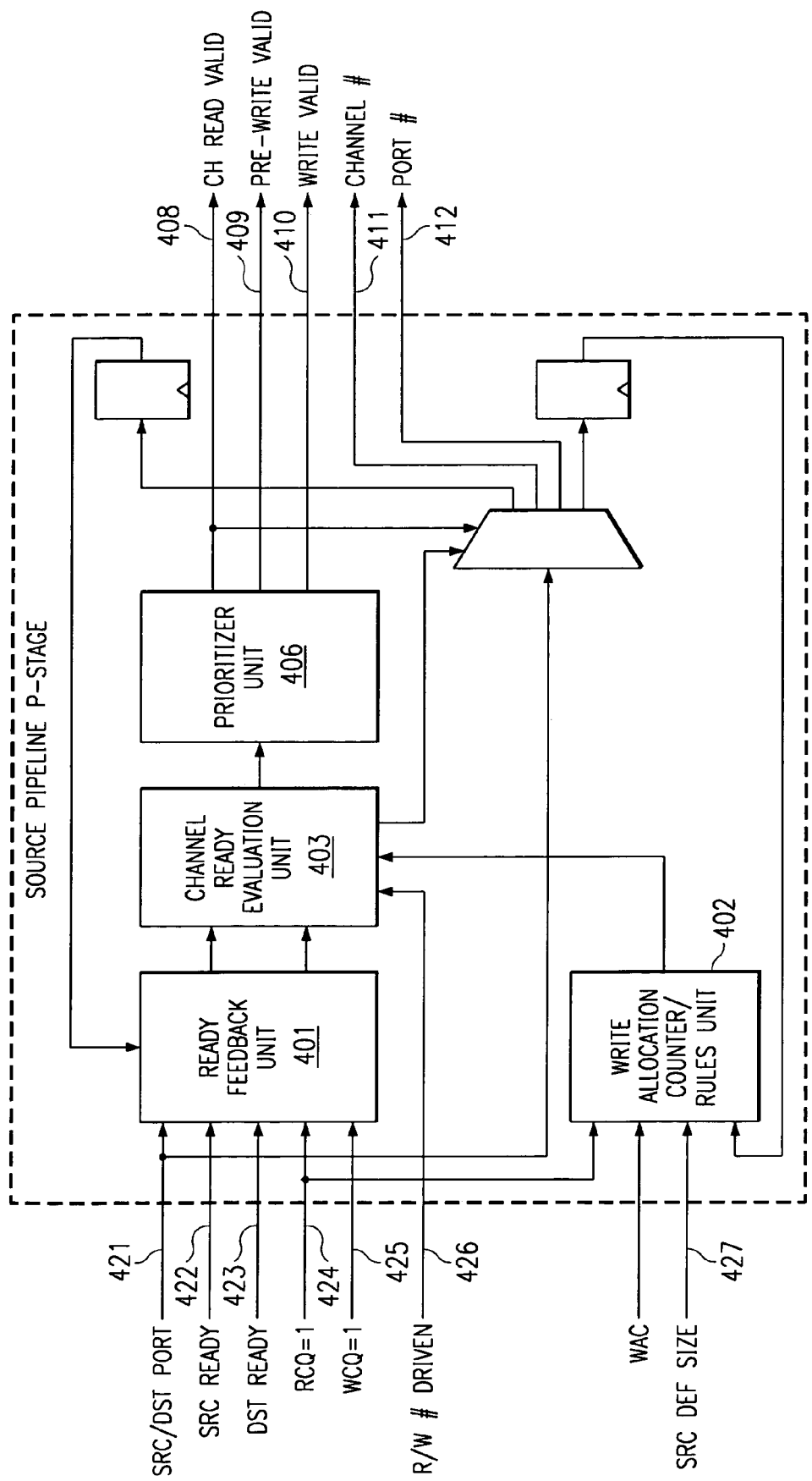
FIG. 4 illustrates the source pipeline P-stage including the write allocation counter and write allocation counter rules unit.

P-stage 303 illustrated in FIG. 4 starts with two parallel computations. On a per channel basis, ready feedback unit 401 computes source and destination port availability based on queue counters, indicated by read queue counter 424 and write queue counter 425, and previous clock port usage in the P-stage. In the second computation, write allocation counter/rules unit 402 applies write allocation counter rules and determines if read or pre-write needs to be done per channel basis. As noted below, the write allocation counter algorithm is dependent upon the source default read burst size, which is indicated by source default size signal 427. Both of these results are fed to the channel ready evaluation unit 403. Channel ready evaluation unit 403 maps port availability to the type of operation (read/pre-write) and determines if the channel can be scheduled for processing. Channel ready evaluation unit 403 also receives a read/not write driven signal 426 indicating whether read driven or write driven processing is used.

The output the channel ready evaluation unit 403 indicates all channels which are ready for command processing. Next the prioritizer unit 406 selects the highest priority channel which will be scheduled for processing in the following stages. The selected channel is used as control for a multiplexer to determine the port number on which the command will be scheduled.

Source pipeline P-stage 303 prioritizes and schedules one of the active channels for command processing in the following A0/A1 stages of pipeline. The output of source pipeline P-stage 303 is the selected channel number 411 and the port number 412 to which the command will be scheduled. A valid read/write command is identified by either a channel read valid signal 408 or a write valid signal 410 being asserted. A valid pre-write command is identified by a pre-write valid signal 409.

There are four macro-level logical operations involved in source pipeline P-stage 303 operation. The ready feedback unit 401 further qualifies the channel SRC ready signal 422 and DST ready signal 423 from source pipeline M-stage 302 to alleviate one cycle inaccuracy in the local port counter values due to the pipelining effect. Write allocation counter/ rules unit 402 identifies if a read or reservation station pre-write operation needs to be performed for channels performing write-driven processing. Channel ready evaluation unit 403 determines if a channel is ready for scheduling based on the source/destination port availability and read/ pre-write type of operation. Prioritizer unit 406 selects the highest priority channel that is ready for scheduling.

Write Allocation Counter (WAC)

The source pipeline has a write allocation counter/rules unit 402 associated with each and every channel. Each write allocation counter/rules unit 402 sequences write driven processing operations. This counter is used to throttle fast source port read operations based on the amount of data that can be consumed immediately by a slow destination port write reservation station and the channel data router 150 buffers. This ensures that a source port response queue is not blocked with data that cannot be consumed by the requesting channel data router 150 and its corresponding slow destination port. This condition blocks the source port from providing data to the other channel destination ports.

A reservation station pre-write at the destination port causes write allocation counter/rules unit 402 to increment the write allocation count by the smallest of the burst size of the destination port, the number of words left to transfer or the size based on alignment. A non-zero value of the write allocation count enables primary reads at the source port. The write allocation count is decremented as reads get posted to the source port provided the write allocation count does not go below zero. Note that it is possible to do multiple reservation station writes to the destination port before performing reads at the source port.

Write Allocation Counter Algorithm

For a write driven process, the decision to issue a read to the source port or a reservation station pre-write to the destination port is made based on the value of the write allocation count. For maximum performance, it would be desirable to do read/write operations of burst size and avoid read/write operations of smaller than burst size. The following rules reflect this reasoning and bias toward reservation station writes until the write allocation count is greater than read burst size or the reservation station is full. The rules are applied by the write allocation counter/rules unit 402 which implements the write allocation counter algorithm.

To clarify the write allocation counter algorithm, consider the concept from its basic requirements. In write driven processing the transfer controller hub is not allowed to read from a source port more than the amount of data for which space has been allocated in the destination port. A counter is needed to keep track of how much space has been pre-allocated. This is the write allocation count.

Figure 5:
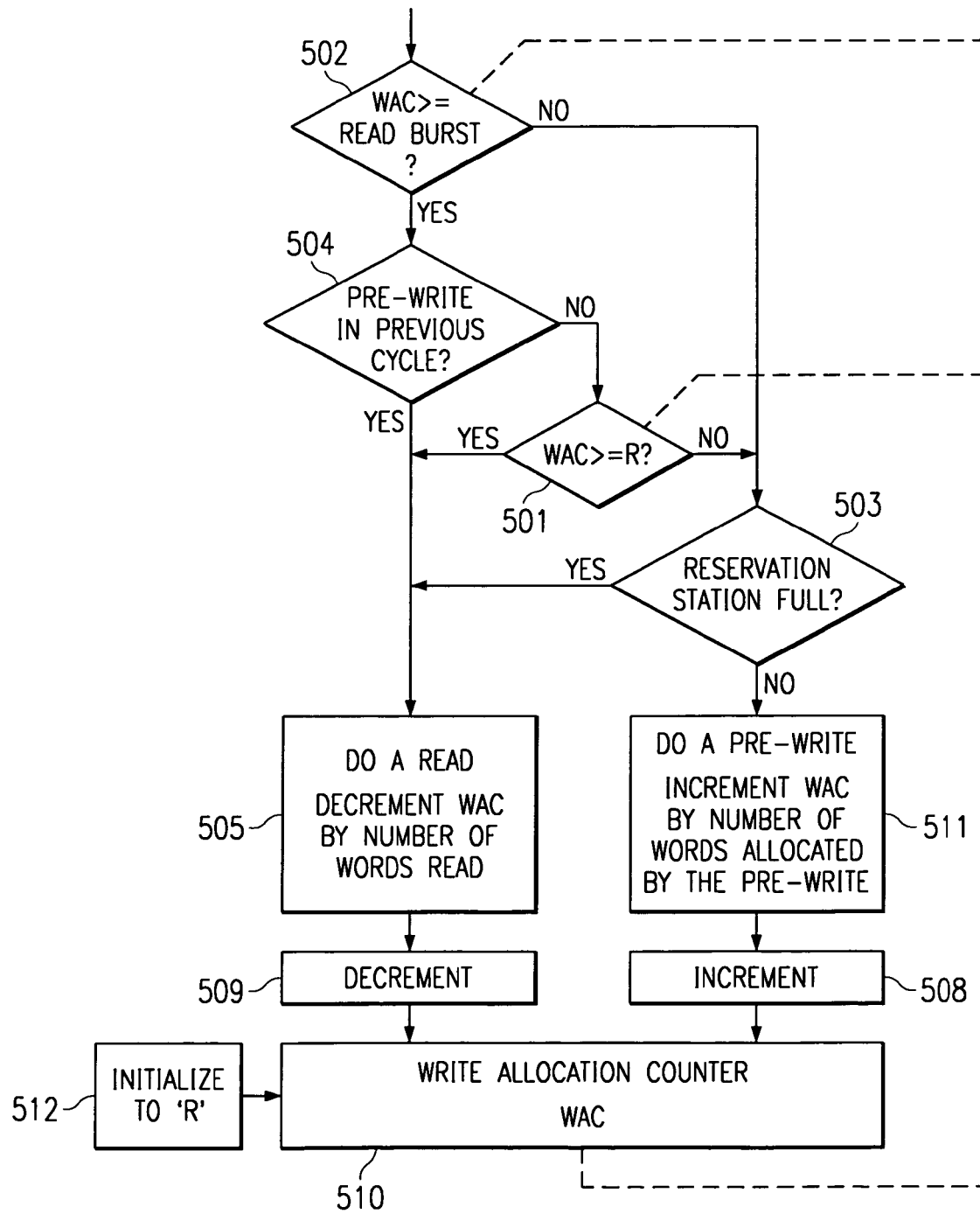
FIG. 5 illustrates the write allocation counter algorithm in flow chart form.

FIG. 5 illustrates the write allocation counter algorithm. The write allocation count is incremented by the number of words allocated in the reservation station by a pre-write (511). The write allocation counter is decremented by the number of words read during a read (505). The value of the write allocation count at any time is the number of words which can be read without causing a backlog in the source port. Thus the write allocation count is initialized to the capacity of the data router 150 R (512).

A pre-write cannot occur unless there is at least one reservation station entry available in the destination port. Thus a pre-write may have to wait for a destination write from a reservation station to free space. A pre-write accomplishes two things. A pre-write increments (508) the write allocation count by the number of words being reserved in the destination port's reservation station. A pre-write causes the hub's local counter of number of available reservation station entries for the destination port to decrement. Thus the count of available reservation station entries decrements. During the source pipeline C-Stage 306 operation at the end of a pre-write, the address alignment, word count, and channel number of the pre-write are sent to the destination port. These quantities are stored in the reservation station entry assigned to the destination port. Sometime later, the data which has been read is transferred to the destination port. When all the data for a particular reservation station entry has arrived, the destination port can complete the write. It then marks that reservation station entry as not in use, and sends a signal to the hub telling it to increment its count of available reservation station entries associated with that port.

A separate count of available reservation station entries for each port is maintained in the ready feedback unit 401 of FIG. 4. Ready feedback unit 401 contains one of such counter for each port. When the counter for a specific port decrements to zero, the condition "reservation station full" becomes true for that port.

Because some amount of data can be staged in the data router 150, it is possible to read slightly more than the amount pre-allocated before stalling the source port. If the data router 150 holds R words, it is possible to read R words more than has been pre-allocated in destination port reservation stations without causing a backlog in the source port. It is desirable to allow this to occur to ensure reads of up to the burst size can be achieved wherever possible. If the initial value of the write allocation count is zero, this would require support for negative numbers. To avoid this and to simplify the implementation, in the preferred embodiment the write allocation count is pre-initialized (512) to R, the number of words which can be staged in the data router 150. Using this technique, the minimum value the write allocation count can take is 0. Any read which would cause the write allocation count to fall below 0 will be annulled.

A read should be performed only if the write allocation counter is greater than or equal to the read burst size. If the read burst size is larger than the write burst size, it will take several pre-writes before the write allocation count is large enough for a read to start.

The decision about what process proceeds next is carried out in the source pipeline P-stage 303. However, the write allocation count value is maintained in A-stages. Therefore, at the point at which a decision is made based on the value of write allocation counter, there may be changes to the value pending as a result of requests scheduled on previous cycles. These need to be accounted for in order to reduce the probability of having to annul a read. If there was no write in the previous cycle, then the value of write allocation count is not going to be increased in the coming clock cycle. It may be about to be decreased in the coming clock cycle by a previously scheduled read or may not be decreased if no read is scheduled. In this case, it is desirable to minimize the probability of a scheduled read having to be annulled due to an attempt to decrement the write allocation counter below zero by further requiring that the write allocation count be greater than or equal to the data storage capacity of data router 150.

FIG. 5 illustrates the write allocation counter algorithm in flow chart form. The write allocation counter (510) is initialized at the capacity R of data router 150 (512). The write allocation counter algorithm operates as follows:

Do a source data read (block 505) if:
 (1) the write allocation count is greater than or equal to the read burst size (Yes at decision block 502) AND
  there was pre-write on previous cycle (Yes at decision block 504); OR
 (2) the write allocation count is greater than or equal to the read burst size (Yes at decision block 502) AND
  there was not pre-write on previous cycle (No at decision block 504), AND
  the write allocation count is greater than the capacity R of data router 150 (Yes at decision block 501); OR
 (3) the write allocation count is not greater than or equal to the read burst size (No at decision block 502) AND
  the reservation station full (Yes at decision block 503).

Do a pre-write (block 511) if:
 (1) the write allocation count is not greater than or equal to the read burst size (No at decision block 502), AND
  the reservation station is not full (No at decision block 503); OR
 (2) the write allocation count is greater than or equal to the read burst size (Yes at decision block 502), AND
  there was not a pre-write on previous cycle (No at decision block 504), AND
  the write allocation counter is not greater than or equal to the data capacity R of data router 150 (No at decision block 501), AND
  the reservation station is not full (No at decision block 503).

The write allocation count is decremented on a source data read (block 508). The write allocation count is incremented on a pre-write (block 509). These rules were selected empirically through simulation. They provide a good compromise between low latency and efficiency. High latency would result if the rule were to wait for write allocation counter to fully resolve and allow new requests to start only every few cycles. Lack of efficiency would result if too many reads were annulled because the write allocation counter would go below zero.

A additional refinement adjusts the data transfer size. If a read is annulled because the write allocation counter would otherwise have gone negative and the write reservation station is full, then the value of write allocation counter is used as the read transfer size when the read is re-attempted. If this is not done then deadlock would result. Reads could continue to be attempted and annulled until some space was freed up in the reservation station. By the same token, however, no space would actually be freed up because the data for the pre-write would never arrive because the read would never actually take place. The adjustment in the data transfer size prevents this deadlock.

What is claimed is:

1. A method for tracking allocated space in a write reservation station of a data transfer controller using a write allocation count, said method comprising the steps of:
 initializing said write allocation count to a predetermined constant prior to performance of any data transfers;
 incrementing said write allocation count on allocation of a block of write reservation station space at a data destination for future storage of data read from a data source;
 decrementing said write allocation count on a read from a data source destined for a write reservation station;
 if said write allocation count meets predetermined criteria, then reading from said data source, transferring said read data to a data destination via a data routing channel and storing said transferred data in allocated write reservation station space; and
 if said write allocation count does not meet said predetermined criteria, then performing no further allocations of space to said write reservations station until said write allocation count meets said predetermined criteria.

2. The method of claim 1, wherein:
 said predetermined constant of said step of initializing said write allocation count equals a number of data words storable in said data routing channel.

3. The method of claim 1, wherein:
 said step of incrementing said write allocation count on allocation of a block of write reservation station space for future storage of data read from a data source increments said write allocation count by an amount equal to a number of data words allocated.

4. The method of claim 1, wherein:
said step of decrementing said write allocation count on a read from a data source decrements said write allocation count by an amount equal to a number of data words read.

5. The method of claim 1, wherein:
said step of reading from said data source reads data in an amount equal to a read burst size constant related to a default read burst size of said data source.

6. The method of claim 5, wherein:
said predetermined criteria of said write allocation count includes whether said write allocation count is greater than or equal to said read burst size constant.

7. The method of claim 5, wherein:
said predetermined criteria of said write allocation count includes whether said write allocation count is greater than or equal to a number of data words storable in said data routing channel.

8. The method of claim 5, wherein:
said predetermined criteria of said write allocation count is met if
said write allocation count is greater than or equal to said read burst size constant, and
an allocation of a block of write reservation station space was made in an immediately prior cycle.

9. The method of claim 5, wherein:
said predetermined criteria of said write allocation count is met if
said write allocation count is greater than or equal to said read burst size constant, and
an allocation of a block of write reservation station space was not made in an immediately prior cycle, and
said write allocation count is greater than or equal to a number of data words storable in said data routing channel.

10. The method of claim 5, wherein:
said predetermined criteria of said write allocation count is met if
said write allocation count is not greater than or equal to said read burst size constant, and
all write reservation station space at said data destination has been allocated.

11. The method of claim 5, where:
said predetermined criteria of said write allocation count is not met if
said write allocation count is not greater than or equal to said read burst size constant, and
all write reservation station space at said data destination have not been allocated.

12. The method of claim 5, wherein:
said predetermined criteria of said write allocation count is not met if
said write allocation count is greater than or equal to said read burst size constant, and
an allocation of a block of write reservation station space was not made in an immediately prior cycle, and
said write allocation count is not greater than or equal to a number of data words storable in said data routing channel, and
all write reservation station space at said data destination have not been allocated.

13. The method of claim 1, further comprising the steps of:
reading data from said reservation station space and writing said read data to said data destination at rate determined by said data destination;
deallocating a block of write reservation space at said data destination upon reading data from said reservation station space and writing said read data to said data destination; and
said step of incrementing said write allocation count on allocation of a block of write reservation station space at said data destination occurs only if at least some write reservation station space has not been allocated.

14. The method of claim 13, wherein:
said step of reading data from said reservation station space reads data in an amount equal to a write burst size constant related to a default write burst size of said data destination; and
said step of deallocating a block of write reservation space at said data destination deallocates a block having a size equal to said write burst size constant.

* * * * *